Jan. 24, 1961  F. L. STOLLER  2,969,349
RECOVERY OF POLYMERIZATION CATALYST
Filed Oct. 9, 1957
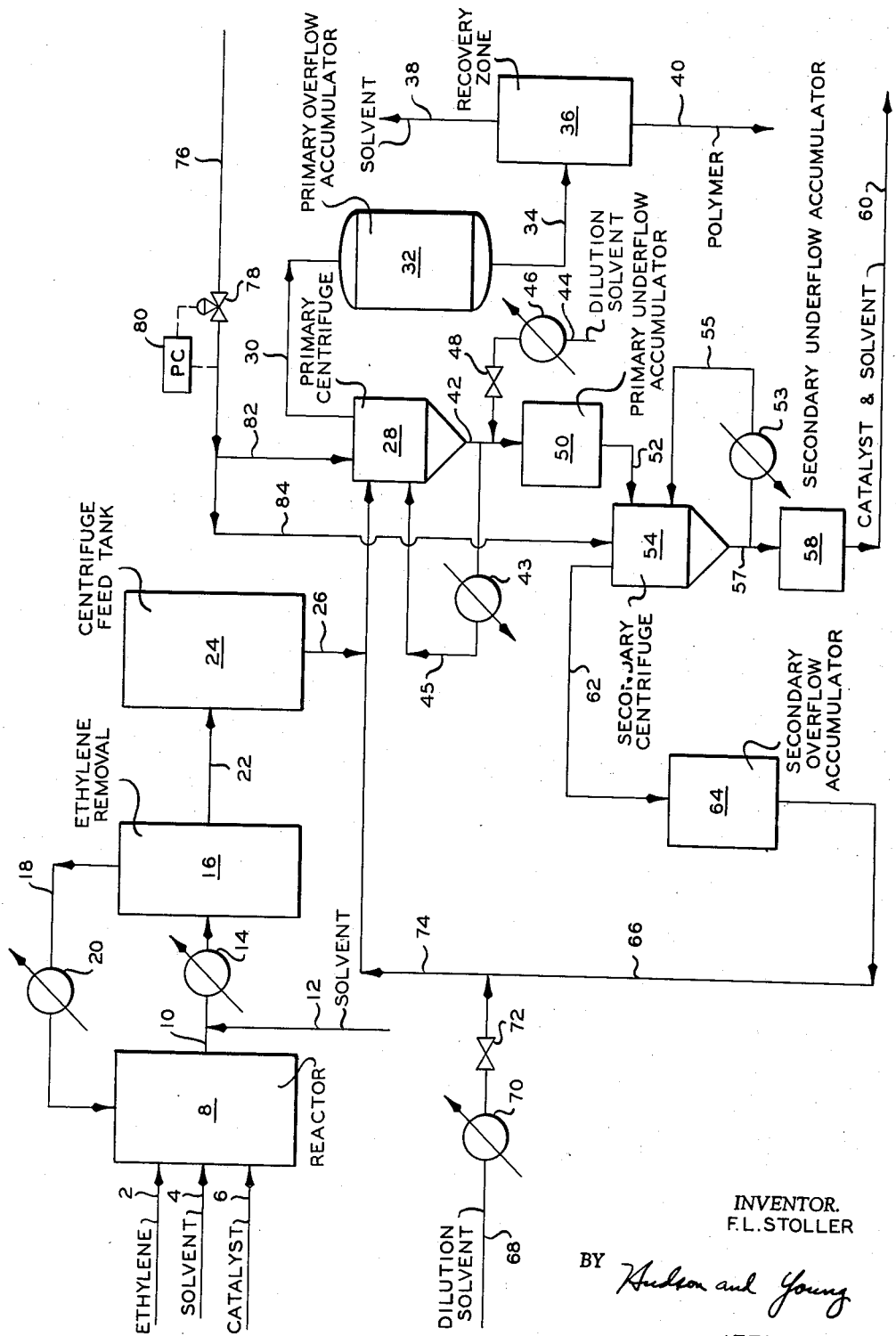
INVENTOR.
F.L.STOLLER
BY *Hudson and Young*
ATTORNEYS United States Patent Office 2,969,349
Patented Jan. 24, 1961

2,969,349

RECOVERY OF POLYMERIZATION CATALYST

Frederick L. Stoller, Bartlesville, Okla., assignor to Phillips Petroleum Company, a corporation of Delaware Filed Oct. 9, 1957, Ser. No. 689,229

3 Claims. (Cl. 260—94.9)

This invention relates to a catalyst recovery process. In one aspect it relates to the recovery of solid subdivided polymerization catalyst from a polymer solution by centrifugation.

In many instances the problem of recovering or removing solid polymerization catalyst from a polymer material, for example, from a solid polymer of ethylene entails substantial difficulties because of the physical characteristics of the polymer. For example the polymer tends to be very sticky when wet and is inclined to agglomerate and adhere to process equipment. The polymerization process is preferably carried out in the presence of a solvent material whereby the polymer during its formation and after its removal from the reaction zone can be maintained in solution. This use of a solvent material substantially overcomes the sticking tendency of the polymer. The volatility of the solvent employed and the difficulty of keeping the polymer in solution make it desirable to carry out the polymerization process and the subsequent catalyst separation and recovery at elevated temperatures and pressures.

It has been found that good separation between the polymer and catalyst can be obtained by centrifugation. Because of the temperature involved it is necessary to carry out the separation under superatmospheric pressure in order to maintain the solvent in the liquid state. As an aid in maintaining the elevated pressures required, various inert gases are employed, however, the use of these gases introduces certain disadvantages. For example, at least a portion of the gases are lost through usage which increases the cost of the process. Also use of the gases requires equipment for separating and recovering the gases following the catalyst removal. In addition various impurities can be introduced to the catalyst recovery system by the use of the various inert gases. Also foaming is reduced by eliminating the inert gas.

It is an object of this invention to provide an improved process for the recovery of solid polymerization catalyst from an olefin polymer solution.

Another object of this invention is to provide an improved process for the recovery of solid polymerization catalyst from a solution of an olefin polymer by centrifugation.

Still another object of this invention is to provide an improved process for the recovery of chromium oxide catalyst from a solution of ethylene polymer by centrifugation.

These and other objects of the invention will become more readily apparent from the following detailed description and discussion.

The foregoing objects are achieved broadly by introducing a stream containing catalyst, polymer and liquid solvent to a centrifuging zone wherein separation of catalyst and polymer takes place and introducing superheated solvent vapor to said zone at a rate sufficient to maintain a pressure in said zone exceeding the vapor pressure of the liquid solvent.

This invention is applicable in general to the treatment of olefin polymers such as, for example, polymers or copolymers of monoolefins like ethylene, propylene, butylene, etc.; also, copolymers of monoolefins and diolefins such as butadiene, isoprene, etc. These polymers are prepared usually by contacting the olefin to be polymerized with a subdivided mobile catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering after which the solid catalysts are dried and activated at temperatures in the range of 450° F. to 1500° F. under non-reducing conditions for several hours. For a detailed discussion of the catalysts, their composition and their methods of preparation, reference can be had to the copending application of Hogan and Banks, Serial No. 573,877, filed March 26, 1956, now Patent No. 2,825,721, wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is maintained at a sufficient level to assure a liquid phase reaction, that is, at least about 100 to 300 p.s.i.g., depending upon the type of feed material and the polymerization temperature. Higher pressures up to 500 to 700 p.s.i.g. or higher can be used, if desired. The catalyst concentration in the reactor varies from between about 0.01 and about 10 percent by weight. Generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, as previously stated, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents can also be used; however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at normal atmospheric temperatures. While the polymerization of ethylene provides a preferred embodiment of the invention, it is not intended that the scope of the invention be limited thereby but that any of the other processes described are also within the invention.

One method of preparing polymers of olefins is described in detail in a copending application of Hogan and Banks, Serial No. 573,877, filed March 26, 1956, now U.S. Patent 2,825,721 (1958). This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid states. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

In carrying out the invention in one embodiment thereof, a polymerization reaction product containing sub-divided solid catalyst, such as chromium oxide catalyst containing hexavalent chromium, and polymer, such as ethylene polymer, in solution is introduced to a centrifuging zone. In this zone separation between polymer solution and catalyst is effected, with the polymer solution passing from the upper part of the centrifuging zone as overflow and the catalyst from the lower portion of said zone as underflow. To minimize flashing of solvent in the centrifuging zone, which would disrupt its operation and hinder the separation of catalyst and polymer solution, solvent vapor is introduced to this zone at a pressure which substantially exceeds the vapor pressure of the liquid solvent present therein. Since the introduced solvent is at a pressure higher than the equilibrium pressure existing in the centrifuging zone this material tends to condense and become a part of the polymer solution. It is desirable that the pressure in the centrifuging zone be maintained above the vapor pressure of the liquid solvent, therefore it is necessary to introduce solvent vapor at a sufficient rate to provide this pressure differential. The degree of pressure differential required to prevent solvent vaporization is small, usually between about 0.1 and about 35 p.s.i.g., and preferably at least about 1.0 p.s.i.g.

The particular operating conditions employed in the centrifuging process depend on a number of factors, including the particular polymer and solvent present in the catalyst stream being treated. Thus, for example, when separating chromium oxide catalyst containing hexavalent chromium from a solution of ethylene polymer in cyclohexane the temperature of the polymer solution entering the centrifuging zone can vary between about 250° and about 350° F. and preferably above about 300° F. At the latter temperature the vapor pressure of cyclohexane is about 80 p.s.i.a. It is desirable therefore that the pressure in the centrifuging zone be maintained between about 81 and about 115 p.s.i.g. To maintain pressures in this range it is necessary to introduce cyclohexane vapor at a rate of between about 0.001 and about 0.1 pounds per pound of cyclohexane present in the centrifuging zone. Since solvent is continuously condensing in the centrifuging zone, heat is being added; therefore the temperature of the zone will tend to increase to a level above the temperature of the feed catalyst and polymer solution. This is not a disadvantage since it aids in dissolution of the polymer, however, if desired means can be provided for removing heat from the centrifuging zone such as, for example, by a cooling jacket or the like.

The separation between the catalysts and the polymer solution, particularly in a single centrifuging zone, is not 100 percent effective and a portion of the catalyst is removed with the polymer and some polymer solution passes from the centrifuging zone with the catalyst solids. For this reason and for viscosity considerations it is desirable that the catalyst polymer solution feed introduced to the centrifuging zone contain a high concentration of solvent, thus minimizing the amount of polymer removed with the catalyst solid. Usually the polymer concentration of each stream is maintained between about 2 and about 6 percent by weight. Centrifugation can be carried out in a single stage or two or more stages in series can be provided if more efficient separation is desired. As stated, the centrifugation is carried out in a temperature range which exceeds the precipitation temperature of the polymer, between about 200° and about 400° F.

In order to more clearly describe the invention and provide a better understanding thereof reference is had to the accompanying drawing which is a diagrammatic illustration of the polymerization process and centrifuging apparatus suitable for carrying out the invention. Referring to the drawing ethylene, cyclohexane solvent and sub-divided chromium oxide catalyst containing hexavalent chromium slurried in cyclohexane are introduced to reactor 8 through conduits 2, 4 and 6 respectively. Within the reactor suitable reaction conditions are maintained, namely a temperature of about 285° F. and a pressure of about 500 p.s.i.a whereby a portion of the ethylene feed is converted to solid ethylene polymer. Agitation of the reaction mixture is provided by a suitable mixing means (not shown) whereby a substantially uniform suspension of catalyst in liquid is maintained in the reactor. A stream of material containing polymer, cyclohexane, catalyst, and unconverted ethylene is withdrawn from the reactor through conduit 10. At this point additional cyclohexane is introduced to the effluent through conduit 12 and the total stream is then passed through a heater 14 wherein the temperature is increased to assure dissolution of the polymer product in the cyclohexane. The effluent stream is then introduced to an ethylene removal zone 16 wherein unconverted ethylene is separated and returned to the reactor 8 through conduit 18 and heater 20. Following this separation the reactor effluent, now containing polymers, solvent and catalyst is introduced to a centrifuge feed tank 24 through conduit 22. From this vessel material is withdrawn through conduit 26 and introduced to a primary centrifuge 28. Before entering centrifuge 28 the feed material is increased in volume by the addition of overflow material from a secondary centrifuge 54 through conduits 66 and 74. Both the primary and secondary centrifuges are adapted to provide separation of solids from liquids at elevated temperatures and pressures. Each centrifuge is constructed to rotate at an extremely high velocity and to provide an overflow product stream of low solids content and an underflow stream concentrated in solids. In order to prevent vaporization of solids during centrifugation, a positive pressure is applied to each centrifuge by introducing thereto super heated solvent vapor through conduits 82 and 84, respectively. The flow of super heated solvent is controlled by control valve 78 which is operated by pressure controller 80, which is set at a pressure slightly above the equilibrium vapor pressure of the solution in the centrifuge.

The overflow from the primary centrifuge 28 exits therefrom through conduit 30 and accumulates in the primary overflow accumulator 32. This stream which contains polymer and solvent and is substantially free from catalyst solids, forms the principal product of the process and is removed from the unit through conduit 34. A further separation of the polymer and solvent can be effected in recovery zone 36, with polymer and solvent being removed through conduits 40 and 38, respectively. The primary centrifuge underflow which contains the remainder of the solvent, substantially all of the catalyst solids and a minor proportion of the polymer is passed from the centrifuge through conduit 42 into the primary underflow accumulator 50. The accumulated material is removed through conduit 52 and introduced into the secondary centrifuge 54 wherein another separation of solids and polymer is effected. In this centrifuge the separation is controlled to provide an overflow containing a quantity of solids thereby effecting maximum recovery of polymer in this stage. This overflow stream is returned to the primary centrifuge through conduit 62 and the secondary overflow accumulator 64 as previously described. The underflow from the secondary centrifuge containing only a very small amount of polymer, a large amount of solvent and substantially all of the catalyst solids is removed from the secondary centrifuge through conduit 57 and introduced to the secondary underflow accumulator 58. The accumulated material is then passed through conduit 60 for further treatment (not shown) to effect recovery of the solvent and the catalyst solids, as desired.

In carrying out the aforedescribed process, it is desirable that the streams entering the centrifuge be maintained at a high temperature and contain a large proportion of solvent in order to assure dissolution of the polymer and to provide a solution of sufficiently low viscosity whereby separation of the solid and liquid portions is readily effected. Accordingly, heated dilution solvent is provided for introduction to each of the centrifuge feed streams. The solvent required in the primary centrifuge is introduced through conduit 68, heater 70 and valve 72. The solvent introduced to the secondary centrifuge is provided through conduit 44, heater 46 and valve 48. As previously pointed out, since superheated solvent introduced to the centrifuging zones is continuously condensing therein, a quantity of heat is being added to the zones. This, however, does not necessarily provide a temperature increase in the centrifuges since the increase in heat input can be compensated for by a reduction in the dilution solvent introduced to each centrifuge. In the event that the dilution solvent cannot be reduced a sufficient amount to maintain the desired centrifuge temperatures, additional heat can be removed by cooling the underflow recycle in each centrifuge, this cooling being provided by coolers 43 and 53, respectively.

It is not intended that the preceding embodiment of the invention be taken in any limiting sense and it is within the scope of the invention to effect the separation of catalyst from various solvents and polymers as previously discussed. It is also within the scope of the invention to employ various modifications of the process described. Thus, for example, the separation of catalyst and polymer can be carried out in a series of centrifuges rather than a single centrifuge. Also, if desired, removal of heat introduced to the centrifuging zone by condensation of the solvent vapor can be effected by suitable means.

The following example is presented in illustration of an application of the invention in a preferred embodiment on a commercial scale.

Example

Chromium oxide catalyst comprising 2.5 weight percent chromium as chromium oxide containing 2.2 percent hexavalent chromium supported on silica-alumina (90/10) is prepared by impregnating the silica alumina with chromium trioxide solution followed by drying and activation in dry air at temperatures up to 950° F. The polymerization reaction and the subsequent separation of polymerization catalyst from the reaction effluent are effected in a process similar to that illustrated by the accompanying drawing, under the following conditions:

Flows:                                                          Lb./hr.
  Reactor feed (2, 4, 6 and 18) _____                20,800
    Composition—                                Wt. percent
      Ethylene _____ 12.64
      Cyclohexane _____ 86.60
      Catalyst _____ 0.076
  Reactor effluent (10) _____                20,800
    Composition—                                Wt. percent
      Ethylene _____ 5.06
      Cyclohexane _____ 86.6
      Polymer _____ 7.58
      Catalyst _____ 0.076
  Primary centrifuge feed (26) _____                17,900
    Composition—                                Wt. percent
      Cyclohexane _____ 91.0
      Polymer _____ 8.83
      Catalyst _____ .088
  Primary dilution solvent (68) _____                14,635
  Primary superheated solvent vapor (82) _____                       98
  Primary centrifuge overflow (30) _____                  39,683
    Composition—                                Wt. percent
      Cyclohexane _____ 96.0
      Polymer _____ 3.88
      Catalyst _____ ____
  Primary centrifuge underflow (42) _____                   7,820
    Composition—                                Wt. percent
      Cyclohexane _____ 95.4
      Polymer _____ 4.2
      Catalyst _____ 0.23
  Secondary dilution solvent (44) _____                   7,806
  Secondary superheated solvent vapor (84) ____                      20
  Secondary centrifuge overflow (62) _____                  14,870
    Composition—                                Wt. percent
      Cyclohexane _____ 97.9
      Polymer _____ 2.0
      Catalyst _____ .01
  Secondary centrifuge underflow (60) _____                     776
    Composition—                                Wt. percent
      Cyclohexane _____ 94.0
      Polymer _____ 3.86
      Catalyst _____ 2.06
Temperatures:                                                      ° F.
  Reactor _____                   290
  Ethylene removal _____                   260
  Primary centrifuge feed _____                   260
  Primary dilution solvent _____                   350
  Superheated solvent vapors _____                   305
  Primary centrifuge _____                   300
  Secondary dilution solvent _____                   299
  Secondary centrifuge _____                   300
Pressures:                                                       P.s.i.a.
  Reactor _____                   500
  Ethylene removal _____                    52
  Primary centrifuge _____                    79
  Secondary centrifuge _____                    79
  Superheated solvent vapors _____                    79

Having thus described the invention by providing a specific example thereof it is to be understood that no undue limitations or restrictions are to be drawn by reasons thereof and that many variations and modifications are within the scope of the invention.

I claim:

1. A process for the separation of subdivided solid chromium oxide catalyst, containing hexavalent chromium associated with a supporting material, from a solution of a normally solid polymer of ethylene in cyclohexane, which process comprises introducing the polymer solution containing catalyst, at a temperature of between about 250 and about 350° F. into a centrifuging zone wherein separation of catalyst from polymer solution takes place, and introducing additional cyclohexane as superheated vapor to the centrifuging zone and thereby maintaining a pressure in said zone exceeding the vapor pressure of the liquid solvent cyclohexane.

2. The process of claim 1 in which additional cyclohexane vapor is introduced to the centrifuging zone at a rate of between about 0.001 and about 0.1 pound per pound of cyclohexane already present therein.

3. In a process in which ethylene is converted to normally solid polymer in the presence of a chromium oxide catalyst active for this conversion, the polymerization being conducted in the presence of a diluent paraffinic hydrocarbon having from 3 to 12 carbon atoms per molecule and an effluent containing said polymer dissolved in said diluent and said catalyst in suspension in said solution is then passed to a centrifuging zone wherein said catalyst is separated from said solution by centrifugation, the improvement which comprises passing superheated vapor of the same diluent hydrocarbon into said centrifuging zone and thereby maintaining a pressure in said zone exceeding the vapor pressure of said solution and maintaining said centrifuging zone at a temperature in the range 200 to 400° F.

References Cited in the file of this patent

UNITED STATES PATENTS

| | | |
|---|---|---|
| 1,634,245 | Jones et al. | June 28, 1927 |
| 2,154,493 | Cooke et al. | Apr. 18, 1939 |
| 2,565,960 | Garber et al. | Aug. 28, 1951 |
| 2,726,234 | Field et al. | Dec. 6, 1955 |
| 2,825,721 | Hogan et al. | Mar. 4, 1958 |
| 2,894,824 | Lanning | July 14, 1959 |